United States Patent [19]

Booker

[11] Patent Number: 4,561,506

[45] Date of Patent: Dec. 31, 1985

[54] PIVOTING DRIVER WITH CHANGEABLE BITS

[75] Inventor: Scott E. Booker, Austin, Tex.

[73] Assignee: International Business Machines Corporation, Armonk, N.Y.

[21] Appl. No.: 512,864

[22] Filed: Jul. 11, 1983

[51] Int. Cl.⁴ .............................................. B25J 11/00
[52] U.S. Cl. ........................................ 173/39; 173/42; 173/43; 901/15; 901/41
[58] Field of Search ............................. 173/42, 43, 39; 414/739, 744 A, 753, 735; 901/41, 42, 43, 52; 409/216, 211, 204

[56] References Cited

U.S. PATENT DOCUMENTS

| Re. 26,904 | 6/1970 | Lemelson | 214/1 |
|---|---|---|---|
| 3,620,095 | 11/1971 | Dane | 901/41 X |
| 3,904,234 | 9/1975 | Hill et al. | 294/106 |
| 4,042,122 | 8/1977 | Espy et al. | 214/1 |
| 4,132,318 | 1/1979 | Wang et al. | 414/739 X |
| 4,273,504 | 6/1981 | Shimatake et al. | 414/728 |
| 4,274,329 | 6/1981 | Weyer | 414/735 X |
| 4,332,066 | 6/1982 | Hailey et al. | 901/15 X |
| 4,353,677 | 10/1982 | Susnjara et al. | 414/735 |
| 4,370,091 | 1/1983 | Gagliardi | 414/735 |

Primary Examiner—James M. Meister
Assistant Examiner—Willmon Fridie, Jr.
Attorney, Agent, or Firm—Andrea P. Bryant

[57] ABSTRACT

A universal driver tool pivotable into a plurality of angular positions is disclosed for use by a computer controlled robotic manipulator. Improved mechanism for connecting the driver tool to the pneumatic system of the robot is disclosed as is a technique for quickly changing the bit driver by the tool without requiring a complete tool change operation.

5 Claims, 6 Drawing Figures

PIVOTING DRIVER WITH CHANGEABLE BITS

DESCRIPTION

1. Technical Field

This invention relates to tools for use by robotic manipulators. More specifically, it relates to improvements in air drivers for screw fasteners used in automatic assembly operations.

2. Background Art

U.S. Pat. No. 4,042,122 to Espy et al discloses a reorientation device for an object manipulator which device includes pneumatically operated rack and pinion devices adapted to rotate turnover plates through a 180° angle. Each turnover plate is adapted to carry one of a set of manipulator fingers. The rotation of each turnover plate can be selectively arrested at a predetermined angle of rotation short of the full 180° movement. Susnjara et al disclose in U.S. Pat. No. 4,353,677 a wrist construction for an industrial robot providing a pivotable tool supporting unit. In U.S. Pat. No. 4,273,504 Shimatake et al disclose improvements in industrial robots including a tool holding arm capable of unitary axial movement as well as rotation. The arm structure may be pivoted to a desired angular position.

Conventionally, robotic air drivers have been designed in either of two configurations. The axial configuration provides a driver bit co-axial with the gripper of the manipulator. The right angle configuration situates the tip of the driver perpendicular to the axis of the gripper. Axial drivers are generally more reliable, especially for the screw starting phase of operation; while right angle drivers are generally necessary for reaching screws whose central axis orientation lies beyond the translation/rotational capabilities of the general purpose manipulator. A particular application requiring both types of drivers is often made somewhat less than optimally efficient due to the necessity of complete tool changes with associated time and motion losses.

Further unproductive time may arise when conventional single purpose drivers are used in an application. If a driver can be used with only one size or type fastener, one or more complete tool changes with their inherent impact on efficiency and reliability may be required. This negative impact is particularly noticeable with pneumatically controlled devices which must be securely connected to pneumatic power sources.

DISCLOSURE OF THE INVENTION

In accordance with the present invention a universal driver is provided which has the advantages of both axial and right angle drivers of the prior art. It is equipped with an internal pneumatically driven rack and pinion mechanism for rotating the driver body through a 90° change of position. Means are provided within the tool for locking the driver in its axial and right angle positions. The driver is further provided with a universal receiver for accepting and utilizing a plurality of bits. The driver is preferably connected to the system pneumatic power source by a means of an integral air coupler which matingly engages an integral receiver in the gripper of the robotic manipulator.

BRIEF DESCRIPTION OF DRAWINGS

The above and further advantages and features will become apparent from the following description in connection with the accompanying drawing in which the reference numerals are used throughout to denote the same parts and wherein.

BEST MODE FOR CARRYING OUT THE INVENTION

Figure 1:
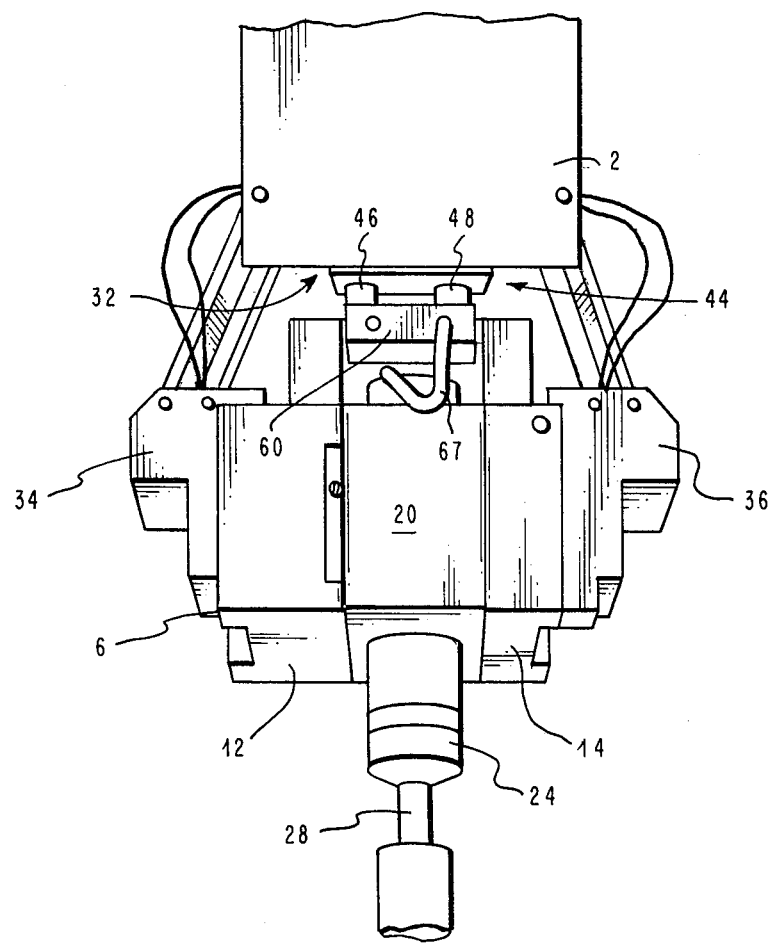
FIG. 1 shows the driver of the present invention operatively connected to the gripper of a computer controlled robotic manipulator.

Referring now to FIG. 1, gripper 2, attached to the arm of a computer controlled manipulator (not shown), is shown grasping the driver device 6 of the present invention. All parts shown but not discussed in FIG. 1 are described with reference to FIG. 2. Driver 6 includes three major components, side plates or blocks 12 and 14, and the central, movable body 20. Body 20 contains a conventional air motor/driver which terminates at its free end with a universal bit engagement portion 24 capable of accepting bits 28 adapted for driving a variety of screw type fasteners. This feature will be described in greater detail having reference to FIG. 5 below.

Figure 2:
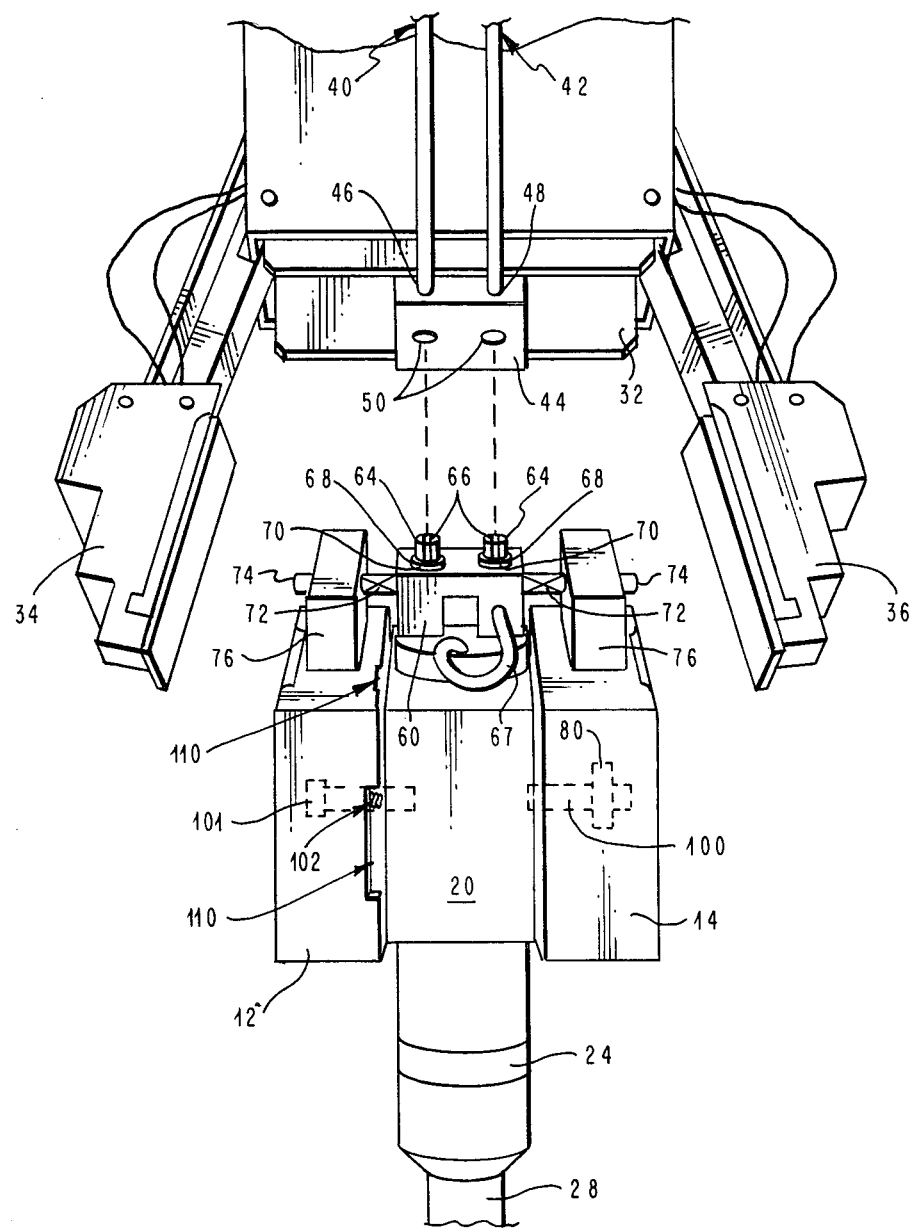
FIG. 2 illustrate the pneumatic connection between the robotic manipulator and the driver tool.

The pneumatic connection between driver 6 and the robot system via gripper 2 will be described having reference to FIG. 2. Gripper 2 includes a central portion 32 joining two movable fingers 34 and 36. Central gripper section 32 is adapted to couple the pneumatic power source of the system to the robotic tools used, such as the driver of the present invention. This arrangement is particularly advantageous in that it tends to eliminate problems of tangling associated with utilizing long flexible tubes for making such a connection to pneumatically powered tools such as air drivers and clamps. In complex applications including many multi-directional moves by the manipulator ample opportunities arise for flexible air tubes to become twisted. As shown, however, the connection is made between the top of driver 6 and central gripper section 32 so that air tubing is not directly attached to driver 6 in umbilical cord fashion. Rather air lines, 40 and 42 are run to gripper section 32. This line can usually be part of the bundle of other cables and hoses supplying electrical and hydraulic signals to the gripper of a robot system.

Gripper section 32 is provided on its lower surface with a receiver block 44 having inlets 46 and 48 connected to air lines 40 and 42, respectively. Receiver block 44 is adapted to accept tool couplers in two cavities 50. Receiver block 44 is permitted limited lateral movement to provide compliance during a coupling operation.

A tool to be grasped, in this case driver device 6, is provided with coupling apparatus configured to matingly conform to cavities 50 and 52. The coupling apparatus shown comprises a coupler block 60 carrying two couplers 64 having central bores 66 for air passage to that each coupler may be further linked to driver device 6 by a short length of flexible tubing 67 (one shown).

Upper and lower O rings, 68 and 70, respectively, are provided on each coupler 64.

Coupler block 60 rides on spring 72 loaded support rods 74 journalled in parallel brackets 76. This arrangement provides limited lateral movement of coupler block 60 while maintaining the block generally centered between brackets 76.

Also shown in phantom are portions of the locking means in side plate 12 and pivot means in side plate 14. Pinion gear 80 is fixedly mounted in shaft 100. Gear 80 is turned by racks (not shown). Shaft 100 is rotatably connected in side plate 14 but fixedly mounted in central body section 20. This aspect of the invention will be described in greater detail with reference to FIG. 3.

Stud 101 is shown in phantom connecting side plate 12 and central body section 20. Stud 101 is coaxial with shaft 100. Stud 101 is rotatably mounted in side plate 12 and fixedly attached to central body section 20.

Figure 4:
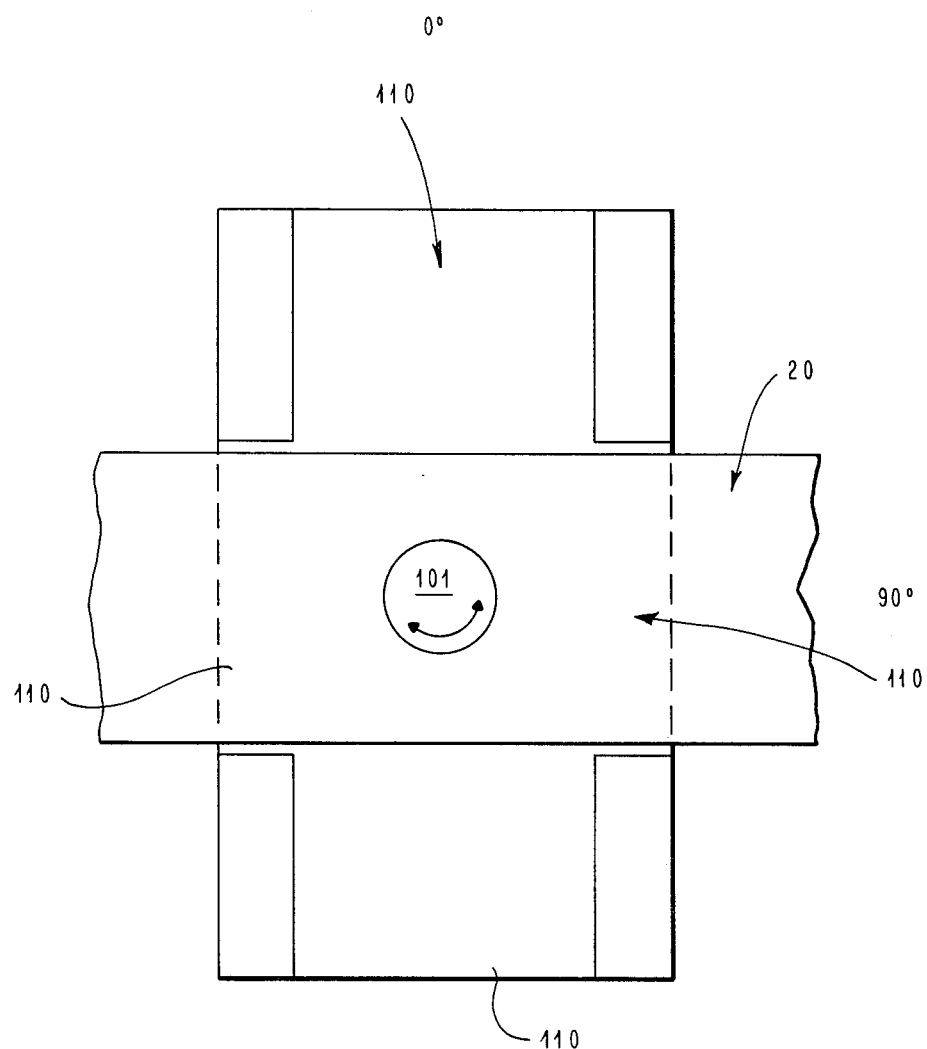
FIG. 4 is a side view (from body 20) of left side plate 12 illustrating the locking channels and body 20 engagement.
Figure 6:
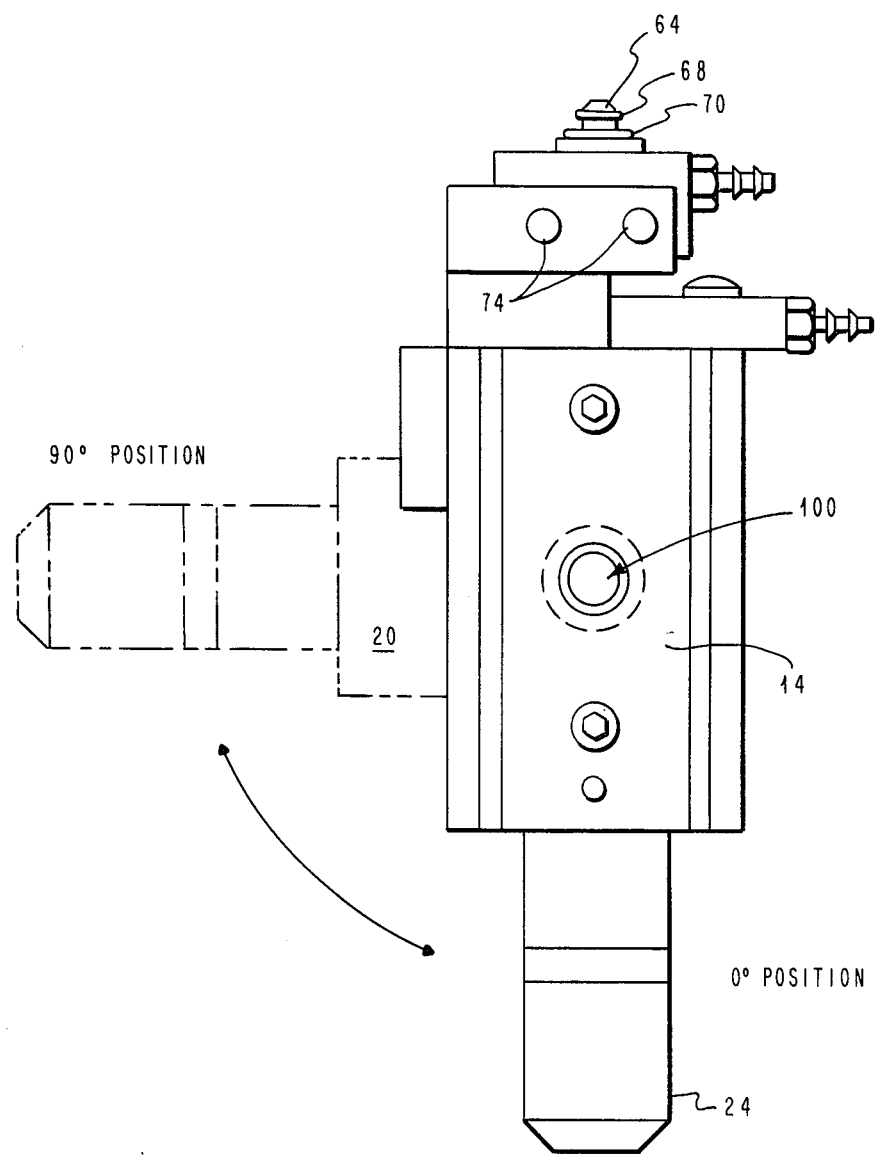
FIG. 6 is a schematic illustration of devices showing the 0° and 90° positioning of body 20.

As will become clear in connection with the discussion of FIG. 4, side plate 12 is provided with orthogonally located pairs of parallel grooves or channels 110 adapted to conform to the periphery of body 20 in either of its operative positions (FIG. 6). Side plate 14 is biased leftwardly by captured spring 102 away from body 20 so that body 20 is free to move for changing the angular orientation of bit 28. Body 20 is restrained from undesired pivoting movement by the locking effect obtained when gripper 2 fingers 34 and 36 exert force on tool 6 adequate to overcome the bias of spring 102 and cause either of the pair of grooves 110 to engage the periphery of body 20.

Figure 3:
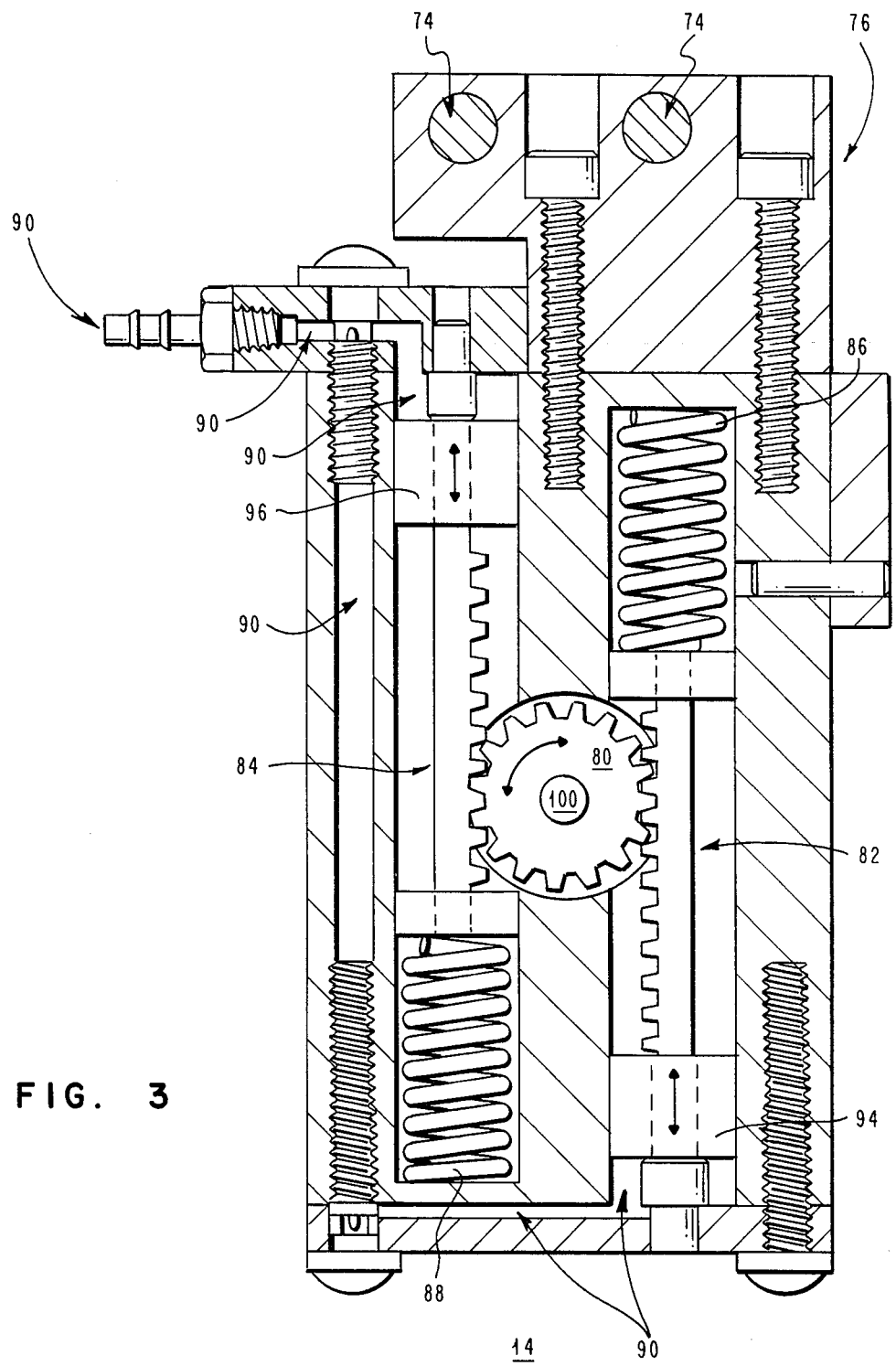
FIG. 3 is a sectional view of the right side plate of the driver showing the rack and pinion mechanism.

Referring now to FIG. 3, the means for pivoting central driver body 20 will be described. Right side plate 14 of driver device 6 is provided a pinion gear 80 for cooperation with spring biased racks 82 and 84 which are pneumatically actuated. Springs 86 and 88 urge racks 82 and 84 in their home position at which driver body 20 is axially aligned. Air under pressure enters through channel 90 to activate pistons 94 and 96 for urging racks 82 and 84 in a direction opposite to the bias of springs 86 and 88. Gear 80 is fixedly mounted to shaft 100, which is journalled in driver body 20 for causing it to pivot about the axis of gear 80.

Left side plate 12 of driver device 6 will be described having reference to FIG. 4. Side plate 12 rotatably receives stud 101 which is fixedly attached to body 20 and axially aligned with shaft 100. Side plate 12 is additionally provided with means for locking body 20 in the chosen position. Channels 110 are provided for compliantly centering and detenting the outermost edges on body 20 at both the 0° (axial) and 90° positions. Side plate 12 is permitted to rotate freely about stud 101 and is also allowed 0.100 inch (2.54 mm) cross axis lateral movement to facilitate the engagement and disengagement of channels 110 on driver body 20. This lateral movement is held under the influence of captured spring 102 (FIG. 2) in the disengaged position.

Figure 5:
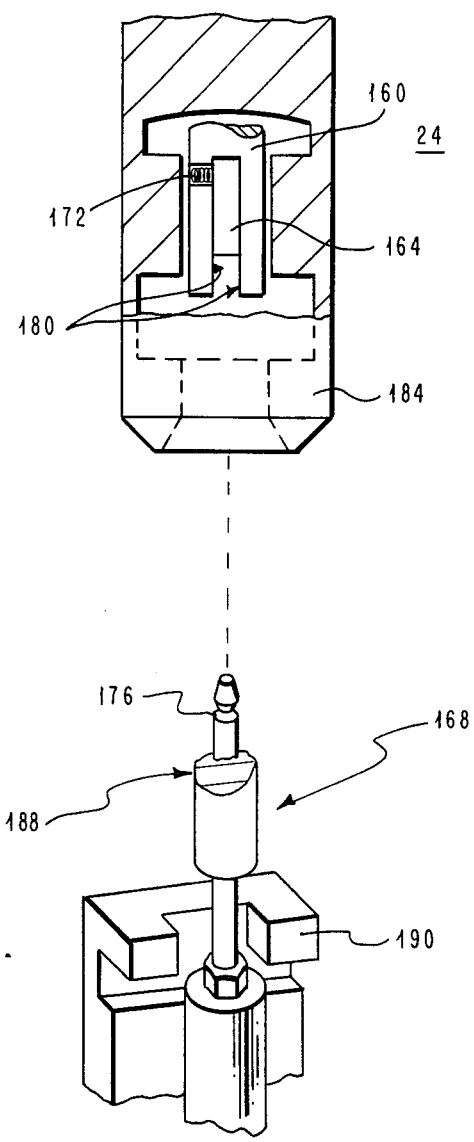
FIG. 5 is a schematic illustration of the universal bit receiver.

FIG. 5 shows the universal bit connecting and changing means employed with the present invention. In the figure, the bit engagement tip 24 is enlarged to facilitate the description. The bottom of conventional air motor output shaft 160 includes pilot bore 164 for receiving a universal bit 168 which is provided on the appropriate driver tip (not shown). Ball Spring detent 172 is provided within bore 164 for engaging detent groove 176 in universal bit 168. Engagement spline 180 is located downstream of detent 172. Lead in support bushing 184 at the very tip end of tip 24 is configured to compliantly accept universal bit 168. Rotation of shaft 160 brings engagement spline 180 into operative contact with swedge 188 on universal bit 168.

The operation of the present invention will be understood from the following description having reference to FIGS. 2 through 6. Gripper 2 under computer control, advances to the tool holder (not shown) where driver 6 is stored. As gripper 2 descends, receiver block 44 cavities 50 are positioned over couplers 64. Compliance is provided as described in conjunction with FIG. 2 to facilitate mating O rings 68 and 70 make an air tight seal thereby enabling air flow from air inlets 46 and 48. Gripper 2 fingers 34 and 36 are caused to grasp side plates 12 and 14 of driver device 6 in the conventional manner. Under the influence of the grasping force imposed on device 6 by fingers 34 and 36, captured spring 102 compresses allowing the engagement of side plate 12 channels 110 on the driver body 20 in the 0° axial position, thus locking the body 20 in this position until the grasping force is released.

A driver tip having a universal bit 168 may be stored in a tool holder such as that shown at 190 in FIG. 5. Gripper 2 positions tool 6 approximately for effecting engagement between bit engagement tip 24 and the universal bit 168 of the desired tool.

When it is desired, while designing a particular automated application, to have central section 20 of driver device 6 pivot about gear 80 into right angle position (FIG. 6), gripper 2 is controlled to release the lock on body 20 provided by side plate 12. This action is accomplished gripper finger 34 is opened slightly (about 0.100 inch/2.54 mm) allowing side plate 12 to slide laterally on stud 101 under the influence of captured spring 102 (FIG. 2). This lateral motion effectively disengages channels 110 from central body section 20 thus allowing the control section 20 to rotate freely about the stud 101 under the influence of the torque generated by gear 80 (FIG. 3). Pressurized air is selectively input to channel 90 to activate pistons 94 and 96 for moving racks 82 and 84. Gear 80 turns and through the connection of gear 80 to shaft 100 to control body section 20 rotates body 20 into its 90° position. Gripper 2 fingers 34 and 36 tighten to lock body 20 in that position by engaging body 20 into the 90° channel 110 on side plate 12 (FIG. 4).

When it is desired to return body 20 to its axial or 0° position air pressure on pistons 94 and 96 is released and gripper 2 is opened slightly to thereby allow disengagement of side plate 12 channels 110 and body 20 allowing body 20 to pivot to its 0° position under the force of springs 86 and 88.

While two lockable positions at 0° and 90° have been shown and described, it should be clear that other angular locking positions may be chosen in lieu of or in addition thereto.

While the invention has been particularly shown and described with reference to a particular embodiment, it will be understood by those skilled in the art that the above mentioned and changes in form and detail may be made without departing from the spirit and scope of the invention.

I claim:
1. A tool for driving bits comprising:
a pair of stationary blocks;
an air driver located between said blocks and pivotably connected thereto;
first means in one of said pair of blocks for selectively pivoting said air driver between two positions, said first means including a pneumatically actuated rack and pinion drivingly connected to the air driver;

second means in the other of said pair of blocks for locking said air driver in a plurality of angular positions, said second means comprising orthogonal pairs of grooves, one of each pair provided in parallel edges of the block, each groove being of the same width as the air driver, on the side of the block adjacent the air driver; and third means for resiliently urging the block into contact with the air driver in either of its two positions.

2. The tool of claim 1 further including fourth means in the air driver for accepting interchangeable bits.

3. An approved tool for robotic manipulation while held in a gripper including:

a generally elongated body comprising an air driver having a bit receiver means connected at one end thereof;

two stationary members located on either side of the body and connected thereto;

means for moving the elongated body about a pivot axis transverse to its linear axis comprising, pneumatically actuated rack and pinion means located in a first one of the two stationary members; and a pair of studs, in axial alignment, attached on either side of the body, one rotatively mounted in each of the stationary members, said one in the first stationary member being fixedly connected to the pinion;

means for locking the elongated body in a plurality of positions, said means for locking comprising, at least two pairs of grooves in the second of the two stationary members, each of said grooves being the width of and adapted to conform to the periphery of the elongated body;

resilient means connected to the second stationary member, said resilient means being adapted to urge the second stationary member away from the elongated body, leaving the body free to pivot;

means for selectively overcoming the resilient means when the body has reached a predetermined position; and means for maintaining the body in either of said pair of grooves; and means for operatively connecting the tool to the power supply systems of the robotic manipulator comprising, at least one cavity in the gripper, said cavity being connected to a source of pneumatic power, and at least one protruding bore on the tool, said protruding bore being adapted to sealingly conform to the interior of the cavity.

4. The tool of claim 3 wherein there are two pairs of grooves arranged transverse to each other.

5. The tool of claim 4, wherein the bit receiver means in the elongated body is adapted for receiving a plurality of interchangeable bits.

* * * * *